(12) United States Patent
Cassano

(10) Patent No.: US 10,217,064 B2
(45) Date of Patent: Feb. 26, 2019

(54) INTELLIGENT HOME SCREEN FOR MOBILE AND DESKTOP OPERATING SYSTEMS

(71) Applicant: APPLE INC., Cupertino, CA (US)

(72) Inventor: David Charles Cassano, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 689 days.

(21) Appl. No.: 13/773,469

(22) Filed: Feb. 21, 2013

(65) Prior Publication Data

US 2014/0237376 A1 Aug. 21, 2014

(51) Int. Cl.
*G06F 3/048* (2013.01)
*G06F 3/0481* (2013.01)
(Continued)

(52) U.S. Cl.
CPC ............... *G06Q 10/00* (2013.01); *G06F 9/44* (2013.01); *G06F 9/4443* (2013.01); *G06F 9/451* (2018.02);
(Continued)

(58) Field of Classification Search
CPC .......... G06F 3/0484; G06F 9/451; G06F 9/44; G06F 9/4443; G06F 3/0481; G06F 8/38;
(Continued)

(56) References Cited

U.S. PATENT DOCUMENTS

2004/0201603 A1 * 10/2004 Kalish ..................... H04L 12/66
715/700
2008/0209335 A1 8/2008 Walsh et al.
(Continued)

FOREIGN PATENT DOCUMENTS

EP 2523436 A1 * 11/2012 ........ H04M 1/72563
WO 2007070510 A2 6/2007

OTHER PUBLICATIONS

Compact Oxford English Dictionary, 2005, Oxford University Press, Third Edition, p. 1067.*
(Continued)

*Primary Examiner* — Tuyetlien T Tran
(74) *Attorney, Agent, or Firm* — Morgan, Lewis & Bockius, LLP

(57) ABSTRACT

An operating system executing on a computing device can move an application's icon to a prominent position within an operating system user interface in response to determining that specified conditions related to that application are currently satisfied. Alternatively, the operating system can automatically create an alias icon for the application in such a prominent position in response to determining that the specified conditions are currently satisfied, thereby leaving the original application icon in its expected position for later use. A set of rules stored on the computing device can specify, for each application, the set of conditions that are to be satisfied in order to make that application's icon or alias icon prominent. The set of conditions can involve a current location, current settings, the current date, the current day of the week, the current time of day, information pertaining to contacts, information pertaining to a calendar, etc.

22 Claims, 9 Drawing Sheets

(51) Int. Cl.
  *G06Q 10/00* (2012.01)
  *G06F 9/451* (2018.01)
  *G06F 9/44* (2018.01)
  *G06F 3/0482* (2013.01)
  *G06F 3/0484* (2013.01)
  *G06F 17/30* (2006.01)

(52) U.S. Cl.
  CPC .......... *G06F 3/0481* (2013.01); *G06F 3/0482* (2013.01); *G06F 3/0484* (2013.01); *G06F 17/30905* (2013.01)

(58) Field of Classification Search
  CPC . G06F 3/0482; G06F 17/30905; G06Q 10/00; G06Q 30/02; G06Q 10/10
  USPC ......................................... 715/744, 810, 835
  See application file for complete search history.

(56) References Cited

U.S. PATENT DOCUMENTS

| | | | | |
|---|---|---|---|---|
| 2008/0272907 | A1* | 11/2008 | Bonansea | H04M 1/72519 340/539.11 |
| 2008/0293395 | A1* | 11/2008 | Mathews | G06F 17/30899 455/418 |
| 2009/0254861 | A1* | 10/2009 | Seetharamakrishnan | G11B 27/34 715/810 |
| 2010/0011304 | A1* | 1/2010 | van Os | G06F 3/04817 715/762 |
| 2010/0075648 | A1* | 3/2010 | Matsuoka | H04M 1/72566 455/418 |
| 2011/0040899 | A1* | 2/2011 | Yepez | G06F 9/4415 710/10 |
| 2011/0099508 | A1 | 4/2011 | Liu | |
| 2012/0260202 | A1 | 10/2012 | Jiang et al. | |
| 2012/0297304 | A1* | 11/2012 | Maxwell | H04M 1/72569 715/728 |
| 2013/0014040 | A1* | 1/2013 | Jagannathan | G06Q 50/01 715/765 |
| 2013/0125056 | A1* | 5/2013 | Suda | G06F 3/0488 715/846 |
| 2013/0127896 | A1* | 5/2013 | Park | G09G 5/377 345/592 |
| 2014/0082489 | A1* | 3/2014 | Park | G06F 3/0488 715/702 |
| 2014/0201655 | A1* | 7/2014 | Mahaffey | G06F 3/04817 715/765 |

OTHER PUBLICATIONS

Palenchar, Joseph, "Samsung Adds Two New Galaxy Tab Sizes: This Week in Consumer Electronics Week in Consumer Electronics", Twice, Apr. 4, 2011, 2 pages.

* cited by examiner

US 10,217,064 B2

INTELLIGENT HOME SCREEN FOR MOBILE AND DESKTOP OPERATING SYSTEMS

BACKGROUND

People have become highly reliant upon their mobile devices in performing daily tasks. Modern smart phones, for example, now often are capable of obtaining, storing, and executing a variety of helpful application programs (referred to herein simply as applications) that can greatly assist those phones' users in finding needed information. For example, a passbook application stored on a smart phone can maintain information related to airplane tickets so that the smart phone's user does not need to carry around paper copies of those tickets. Instead of presenting a paper ticket at an airport's gate, the smart phone's user can instead launch the passbook application—typically by touching the application's icon within the smart phone's operating system user interface—and then present a digital image of the ticket to the gatekeeper.

Operating system user interfaces can become cluttered with application icons when many different applications are stored on the mobile device. The space available to present application icons on a mobile device's typically smaller-sized display can be fairly limited. In order to keep the application icons at a size that is large enough to permit those icons to continue to be recognizable to mobile device users, a scheme that groups icons together or that spreads icons over multiple virtual screens can be utilized. For example, a main or home screen of the operating system user interface can be organized to contain a set of application group icons whose selection can cause the operating system to "open up" the corresponding application group, thereby presenting the application icons contained in that application group at regular size. For another example, a set of dots somewhere in the operating system user interface can indicate a quantity of virtual screens that the operating system user interface contains. One of the dots can be highlighted at a given time to indicate which of those virtual screens is currently being presented on the mobile device's display. By making gestures relative to the mobile device's touchscreen, the device's user can instruct the device's operating system to switch the virtual screen that is currently being presented.

Although such schemes can make a multitude of application icons available through the operating system user interface, and at a reasonable size, such schemes do not necessarily make it simple for the mobile device's user to find a specific application icon that he might currently seek. If a particular application icon, such as a passbook application icon, is buried deep within one of several application groups, or is located on one of a multitude of virtual screens through which a user would need to scroll in order to find it, then the time required for the user to locate that particular application icon can become significant. Unfortunately, under some circumstances in which the mobile device's user wants to retrieve the particular application's stored information quickly—such as when the user is boarding an airplane and wants to show his digital ticket to the gatekeeper—the delays produced as a consequence of the user hunting through the depths of the operating system user interface can be unacceptable to the user and to other people waiting behind him in line.

BRIEF DESCRIPTION

DETAILED DESCRIPTION

Embodiments of the invention relate to the field of computing device operating system user interfaces. According to an embodiment of the invention, an operating system executing on a computing device, such as a smart phone, can automatically move an application's icon to a prominent position within an operating system user interface in response to determining that specified conditions related to that application are currently satisfied. Alternatively, the operating system can automatically create an alias icon for the application in such a prominent position in response to determining that the specified conditions are currently satisfied, thereby leaving the original application icon in its expected (but potentially less prominent) position for later use.

A set of rules stored on the computing device can specify, for each application, the set of conditions that are to be satisfied in order to make that application's icon or alias icon prominent. The set of conditions can involve the computing device's current location, the computing device's current settings, the current date, the current day of the week, the current time of day, information pertaining to contacts stored by the computing device, information pertaining to a calendar stored by the computing device, and/or other conditions. In this manner, the computing device's user can find the application's icon or alias icon more easily and quickly under circumstances (predicted by the satisfaction of the corresponding conditions) in which the user is likely to want to interact with that application. Furthermore, application developers can potentially derive more revenue from their applications due to the more prominent, though temporary, placement of their applications' icons in the operating system user interface under circumstances in which users are likely to want to interact with their applications.

In an embodiment of the invention, in response to determining that the specified conditions associated with an application are no longer currently satisfied, the operating system can automatically move, back to its original and expected position within the user interface, an application icon that the operating system previously automatically moved to a prominent position in the operating system user interface. Alternatively, in response to determining that the specified conditions associated with an application are no longer currently satisfied, the operating system can automatically remove, from the user interface, an alias icon that the operating system previously placed at the prominent position.

Example Computing System

Figure 1:
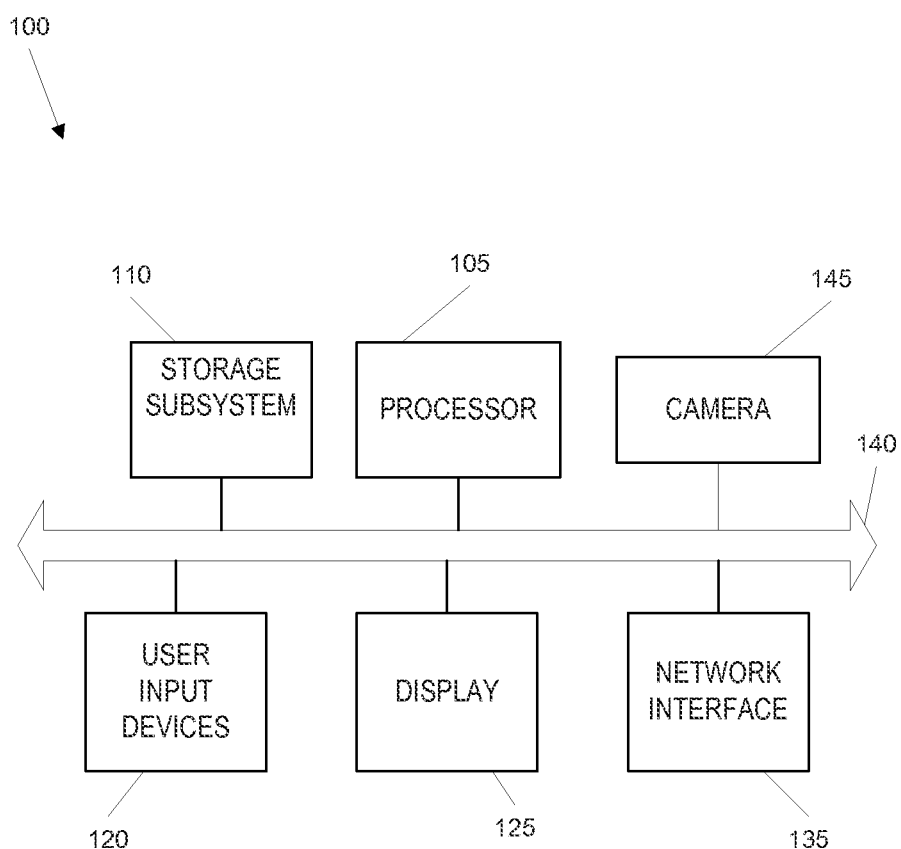
FIG. 1 is a block diagram of a computer system according to an embodiment of the present invention.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

A camera 145 also can be coupled to bus 140. Camera 145 can be mounted on a side of computing system 100 that is on the opposite side of the mobile device as display 125. Camera 145 can be mounted on the "back" of such computing system 100. Thus, camera 145 can face in the opposite direction from display 125.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute an operating system that automatically "surfaces," or temporarily makes prominent, information that is relevant to current circumstances. In some embodiments, the operating system is a software-based process that can determine whether a set of specified conditions are satisfied, and, in response to determining that those conditions are satisfied, can temporarily make prominent some stored information that was not previously as prominent within a user interface of computing system 100.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Multi-Virtual Screen Operating System User Interface

Figure 9:
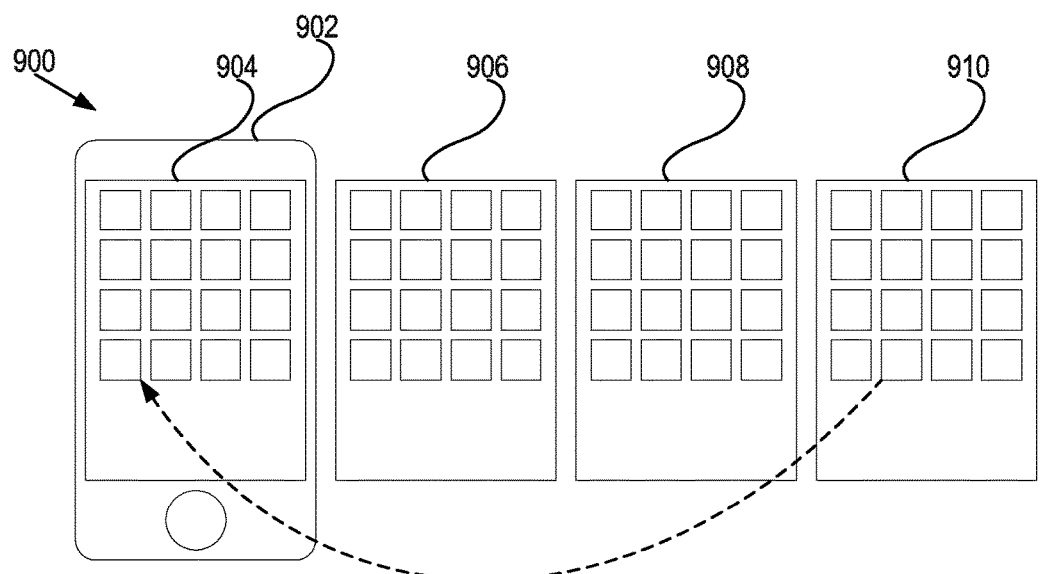
FIG. 9 is a block diagram that illustrates an example of a mobile device that has a multi-virtual screen operating system user interface that can automatically move or create user interface elements in response to specified rules being satisfied, according to an embodiment of the invention.

FIG. 9 is a block diagram that illustrates an example 900 of a mobile device 902 that has a multi-virtual screen operating system user interface that can automatically move or create user interface elements in response to specified rules being satisfied, according to an embodiment of the invention. The multi-virtual screen operating system user interface includes virtual screens 904, 906, 908, and 910. Only one of the virtual screens is displayed at a time by mobile device 902; in this case, virtual screen 904 is currently selected for display by a user of mobile device 902. The user of mobile device can instruct mobile device to display different ones of virtual screens 904, 906, 908, and 910 at different moments in time, typically through gestures made relative to a touchscreen of mobile device 902. In an embodiment of the invention, in response to determining that conditions that are satisfied by a specified rule are currently satisfied, mobile device 902 can move a user interface element (e.g., an application icon or other graphical widget) specified by that rule from a non-displayed virtual screen to the displayed virtual screen. In an alternative embodiment of the invention, in response to determining that conditions that are satisfied by a specified rule are currently satisfied, mobile device 902 can insert a temporary reference (sometimes herein called an alias to a user interface element (e.g., an application icon or other graphical widget) specified by that rule on the displayed virtual screen while maintaining the original user interface element on the non-displayed virtual screen. As shown in FIG. 9 by the dashed line, mobile device 902 is at least temporarily moving, or creating an alias to, a user interface element from currently non-displayed virtual screen 910 to or on currently displayed virtual screen 904. Various techniques for accomplishing these operations are described below.

Moving Application Icons

Figure 2:
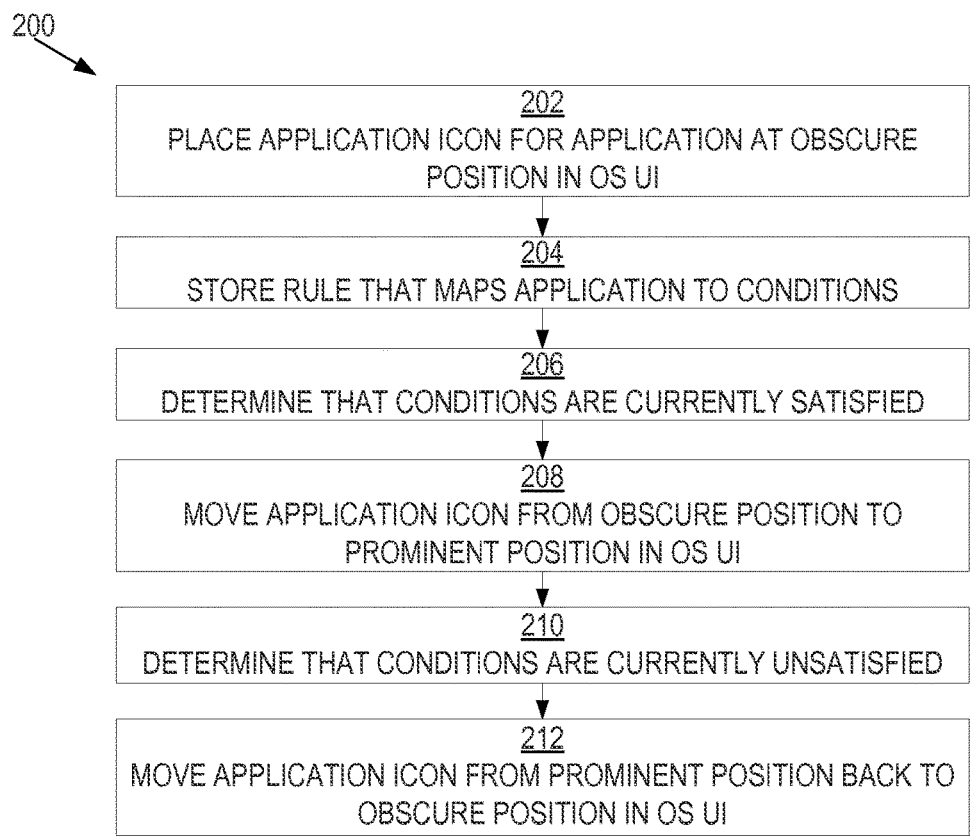
FIG. 2 is a flow diagram that illustrates an example technique for automatically but temporarily moving an application icon to a prominent position in an operating system user interface, according to an embodiment of the invention.

FIG. 2 is a flow diagram that illustrates an example technique 200 for automatically but temporarily moving an application icon to a prominent position in an operating system user interface, according to an embodiment of the invention. Although technique 200 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 202, an application icon for a particular application can be placed at a relatively obscure position in an operating system user interface of a computing device. For example, an application icon for a passbook application can be placed on a seventh of seven sequentially ordered virtual screens that are contained within an operating system user interface of a computing device (e.g., a smart phone) that stores the passbook application.

In block 204, a rule that maps the particular application to a set of specified conditions can be stored on the computing device. For example, the computing device can store (e.g., in its persistent memory) a rule that associates the passbook application with a set of conditions that include the computing device's current location being at an airport.

In block 206, the computing device's operating system can determine that the conditions that the rule maps to the particular application are currently satisfied. For example, the operating system can determine (e.g., using the computing device's global positioning system) that the computing device is currently located at an airport.

In block 208, in response to determining that the conditions that the rule maps to the particular application are currently satisfied, the operating system can move the application icon from the relatively obscure position in the operating system user interface to a relatively prominent position in the operating system user interface. For example, the operating system can move the application icon for the passbook application from the seventh virtual screen to the first (i.e., main or home) virtual screen of the seven sequentially ordered virtual screens that are contained within the operating system user interface. For another example, the operating system can move the application icon for the passbook application from the seventh virtual screen to a particular virtual screen that is currently being presented on the computing device's display, regardless of which of the seven sequentially ordered virtual screens is currently being presented. In an embodiment of the invention, the operating system can temporarily shuffle one or more other application icons from the prominent virtual screen to other virtual screens to make room for the application icon of the particular application.

In block 210, the computing device's operating system can determine that the conditions that the rule maps to the particular application are currently unsatisfied. For example, the operating system can determine (e.g., using the computing device's global positioning system) that the computing device is no longer currently located at an airport.

In block 212, in response to determining that the conditions that the rule maps to the particular application are currently unsatisfied, the operating system can move the application icon from the relatively prominent position in the operating system user interface to the application icon's former (relatively obscure) position in the operating system user interface. For example, the operating system can move the application icon for the passbook application from the first (i.e., main or home) virtual screen back to the seventh virtual screen of the seven sequentially ordered virtual screens that are contained within the operating system user interface. For another example, the operating system can move the application icon for the passbook application from the particular virtual screen that is currently being presented on the computing device's display, regardless of which of the seven sequentially ordered virtual screens is currently being presented, back to the seventh virtual screen on which the application icon was contained prior to the movement of block 208. In an embodiment of the invention, the operating system can replace, to the prominent virtual screen, one or more other application icons from that the operating system temporarily shuffled to other virtual screens to make room for the application icon of the particular application.

Creating Alias Icons

Figure 3:
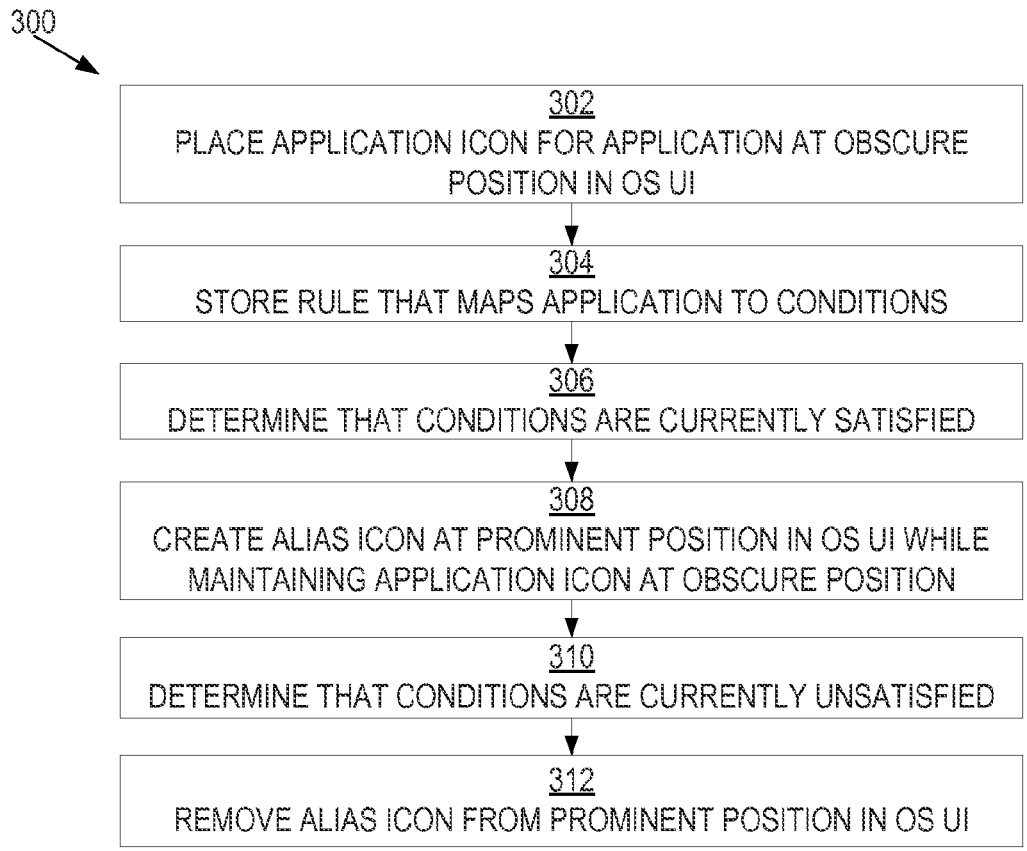
FIG. 3 is a flow diagram that illustrates an example technique for automatically but temporarily creating an application alias at a prominent position in an operating system user interface, according to an embodiment of the invention.

FIG. 3 is a flow diagram that illustrates an example technique 300 for automatically but temporarily creating an application alias at a prominent position in an operating system user interface, according to an embodiment of the invention. Although technique 300 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 302, an application icon for a particular application can be placed at a relatively obscure position in an operating system user interface of a computing device. For example, an application icon for a passbook application can be placed on a seventh of seven sequentially ordered virtual screens that are contained within an operating system user interface of a computing device (e.g., a smart phone) that stores the passbook application.

In block 304, a rule that maps the particular application to a set of specified conditions can be stored on the computing device. For example, the computing device can store (e.g., in its persistent memory) a rule that associates the passbook application with a set of conditions that include the computing device's current location being at an airport.

In block 306, the computing device's operating system can determine that the conditions that the rule maps to the particular application are currently satisfied. For example, the operating system can determine (e.g., using the computing device's global positioning system) that the computing device is currently located at an airport.

In block 308, in response to determining that the conditions that the rule maps to the particular application are currently satisfied, the operating system can create an alias icon at a relatively prominent position in the operating system user interface while maintaining the original application icon at its relatively obscure position in the operating system user interface. For example, the operating system can create an alias icon for the passbook application on the first (i.e., main or home) virtual screen of the seven sequentially ordered virtual screens that are contained within the operating system user interface while maintaining the original passbook application icon on the seventh virtual screen. For another example, the operating system can create an alias icon for the passbook application on a particular virtual screen that is currently being presented on the computing device's display, regardless of which of the seven sequentially ordered virtual screens is currently being presented, while maintaining the original passbook application icon on the seventh virtual screen. In an embodiment of the invention, the operating system can temporarily shuffle one or more other application icons from the prominent virtual screen to other virtual screens to make room for the newly created alias icon.

In block 310, the computing device's operating system can determine that the conditions that the rule maps to the particular application are currently unsatisfied. For example, the operating system can determine (e.g., using the computing device's global positioning system) that the computing device is no longer currently located at an airport.

In block 312, in response to determining that the conditions that the rule maps to the particular application are currently unsatisfied, the operating system can remove the alias icon from the relatively prominent position in the operating system user interface. For example, the operating system can delete the alias icon for the passbook application from the first (i.e., main or home) virtual screen back. For another example, the operating system can delete the alias icon for the passbook application from the particular virtual screen that is currently being presented on the computing device's display, regardless of which of the seven sequentially ordered virtual screens is currently being presented. In an embodiment of the invention, the operating system can replace, to the prominent virtual screen, one or more other application icons from that the operating system temporarily shuffled to other virtual screens to make room for the alias icon.

Location-Based Conditions

Figure 4:
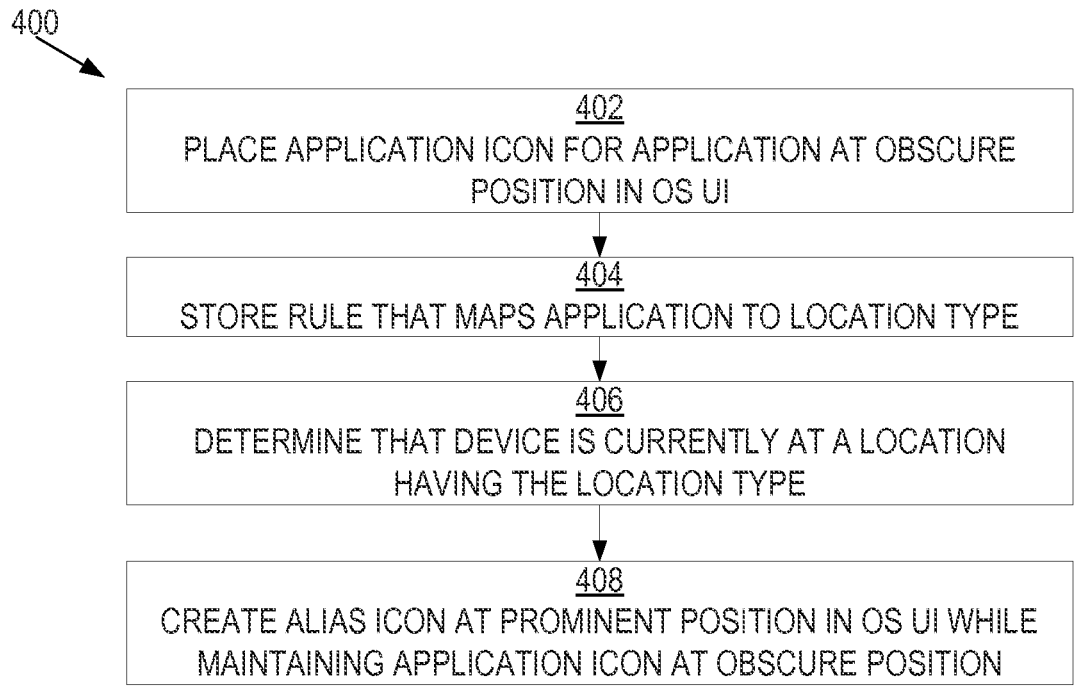
FIG. 4 is a flow diagram that illustrates an example technique for automatically creating an application alias at a prominent position in an operating system user interface in response to a computing device being present at a specified location, according to an embodiment of the invention.

FIG. 4 is a flow diagram that illustrates an example technique 400 for automatically creating an application alias at a prominent position in an operating system user interface in response to a computing device being present at a specified location, according to an embodiment of the invention. Although technique 400 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 402, an application icon for a particular application can be placed at a relatively obscure position in an operating system user interface of a computing device. For example, an application icon for a passbook application can be placed on a seventh of seven sequentially ordered virtual screens that are contained within an operating system user interface of a computing device (e.g., a smart phone) that stores the passbook application.

In block 404, a rule that maps the particular application to a particular location type can be stored on the computing device. For example, the computing device can store (e.g., in its persistent memory) a rule that associates the passbook application with an "airport" location type.

In block 406, the computing device's operating system can determine that the computing device is currently at a location having a particular location type that the rule maps to the particular application. For example, the operating system can determine that the computing device is currently at a location that has an "airport" location type. There are multiple ways in which the operating system can make this determination. For example, the operating system can maintain a mapping between global positioning system (GPS) coordinates and airports having those GPS coordinates. The operating system can then examine the computing device's current GPS coordinates to determine whether they match any of the GPS coordinates stored in the mappings. For another example, the operating system can maintain a mapping between WiFi Access Points (WAP) Internet Protocol (IP) addresses and airports containing those WAPs having those IP addresses. The operating system can then examine the WAP IP addresses currently detected by the computing device's wireless network interface to determine whether they match any of the WAP IP addresses stored in the mappings. Identifiers for wireless beacon systems other than WAPs alternatively can be similarly used in various alternative embodiments of the invention.

In block 408, in response to determining that the computing device is currently at a location having the particular location type that the rule maps to the particular application, the operating system can create an alias icon at a relatively prominent position in the operating system user interface while maintaining the original application icon at its relatively obscure position in the operating system user interface. For example, the operating system can create an alias icon for the passbook application on the first (i.e., main or home) virtual screen of the seven sequentially ordered virtual screens that are contained within the operating system user interface while maintaining the original passbook application icon on the seventh virtual screen. For another example, the operating system can create an alias icon for the passbook application on a particular virtual screen that is currently being presented on the computing device's display, regardless of which of the seven sequentially ordered virtual screens is currently being presented, while maintaining the original passbook application icon on the seventh virtual screen.

Settings-Based Conditions

Figure 5:
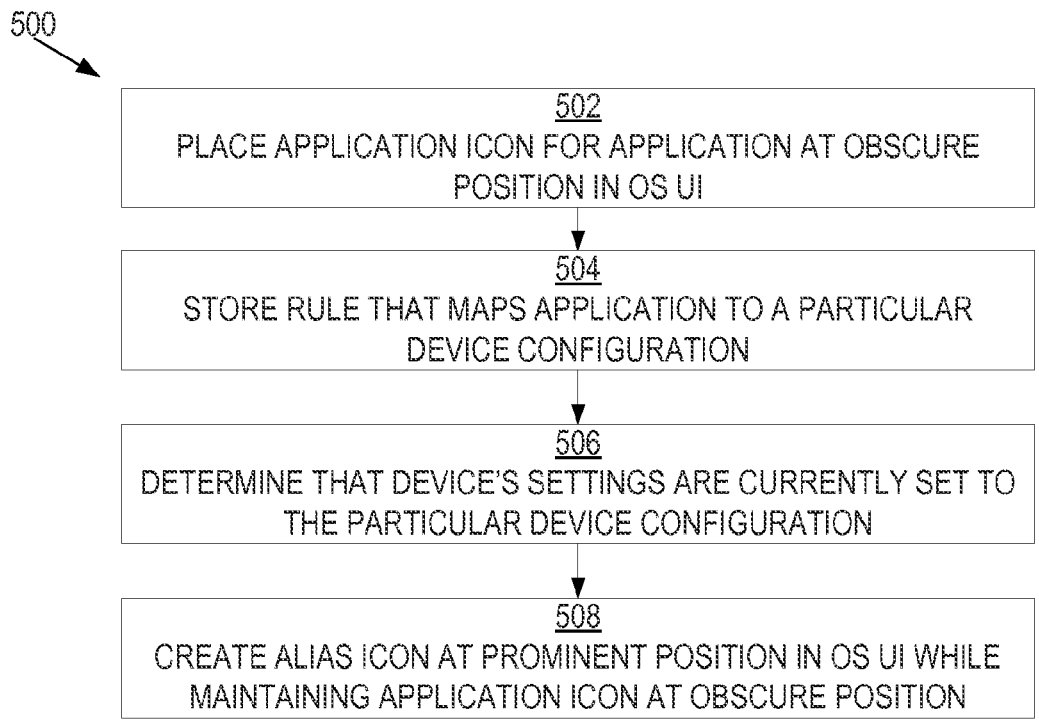
FIG. 5 is a flow diagram that illustrates an example technique for automatically creating an application alias at a prominent position in an operating system user interface in response to settings of a computing device being configured in a specified manner, according to an embodiment of the invention.

FIG. 5 is a flow diagram that illustrates an example technique 500 for automatically creating an application alias at a prominent position in an operating system user interface in response to settings of a computing device being configured in a specified manner, according to an embodiment of the invention. Although technique 500 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 502, an application icon for a particular application can be placed at a relatively obscure position in an operating system user interface of a computing device. For example, an application icon for a music-playing application can be placed on a seventh of seven sequentially ordered virtual screens that are contained within an operating system user interface of a computing device (e.g., a smart phone) that stores the music-playing application.

In block 504, a rule that maps the particular application to a particular computing device configuration can be stored on the computing device. For example, the computing device can store (e.g., in its persistent memory) a rule that associates the music-playing application with an "airplane mode"—a mode in which the network functionality and telephony functionality of the computing device is disabled.

In block 506, the computing device's operating system can determine that the settings of the computing device are currently set to the particular computing device configuration that the rule maps to the particular application. For example, the operating system can determine that the settings of the computing device are currently set to airplane mode. While the device is set to airplane mode, it is likely that the device's user is currently flying on an airplane, currently cannot use network-based or telephone-based functions of his computing device, and therefore might currently be more interested in accessing entertainment-oriented applications stored on his computing device. Placing alias icons for entertainment-oriented applications, such as the music-playing application, in prominent positions while the computing device is set to airplane mode can be beneficial under such circumstances.

In block 508, in response to determining that the computing device is currently at a location having the particular location type that the rule maps to the particular application, the operating system can create an alias icon at a relatively prominent position in the operating system user interface while maintaining the original application icon at its relatively obscure position in the operating system user interface. For example, the operating system can create an alias icon for the music-playing application on the first (i.e., main or home) virtual screen of the seven sequentially ordered virtual screens that are contained within the operating system user interface while maintaining the original music-playing application icon on the seventh virtual screen. For another example, the operating system can create an alias icon for the music-playing application on a particular virtual screen that is currently being presented on the computing device's display, regardless of which of the seven sequentially ordered virtual screens is currently being presented, while maintaining the original music-playing application icon on the seventh virtual screen. The operating system can create multiple such alias icons for multiple applications that are mapped, by separate rules, to the particular computing device configuration. For example, rules can map various entertainment-based applications, such as game applications, music-playing applications, video-playing applications, note-taking applications, news-reading applications, and/or book-reading applications, to the airplane mode.

In an embodiment of the invention, the operating system can temporarily shuffle one or more other application icons from the prominent virtual screen to other virtual screens to make room for the newly created alias icons. In one such embodiment of the invention, the operating system can choose to shuffle away application icons that are associated with functionality that the computing device is prohibited from using while the settings of the computing device are currently set to the particular computing device configuration that the rule maps to the particular application. For example, while a computing device is set to airplane mode, the operating system can temporarily move, to less prominent virtual screens, all application icons that are associated with networking functionality or telephony functionality.

Time-Based Conditions

Figure 6:
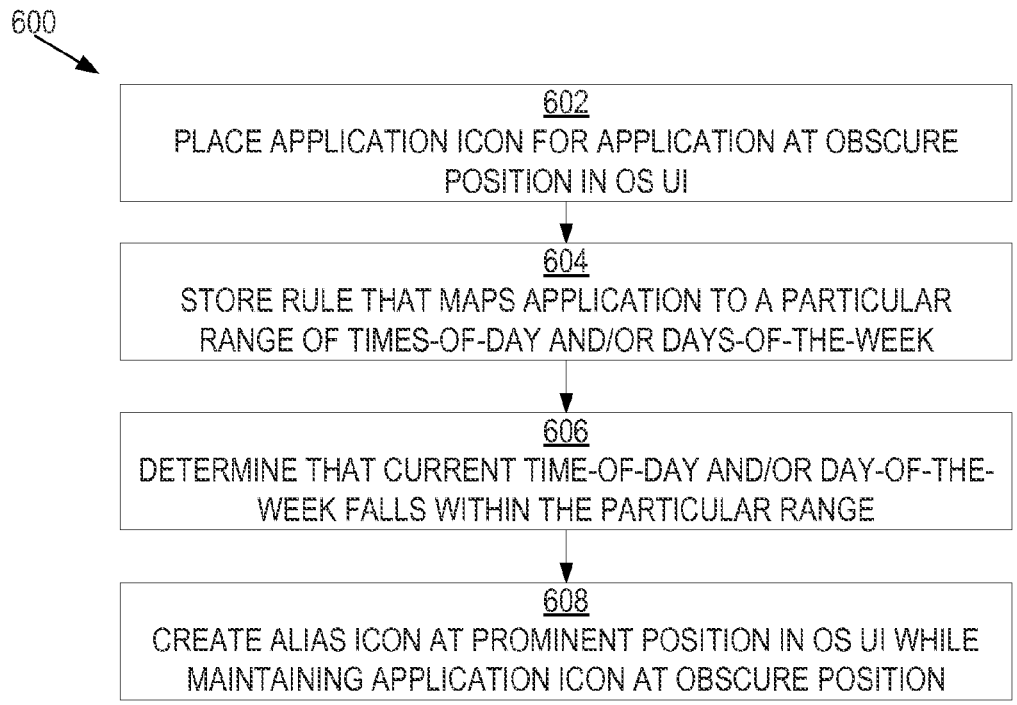
FIG. 6 is a flow diagram that illustrates an example technique for automatically creating an application alias at a prominent position in an operating system user interface in response to the current time of day being a specified time of day or in response to the current day of the week being a specified day of the week, according to an embodiment of the invention.

FIG. 6 is a flow diagram that illustrates an example technique 600 for automatically creating an application alias at a prominent position in an operating system user interface in response to the current time of day being a specified time of day or in response to the current day of the week being a specified day of the week, according to an embodiment of the invention. Although technique 600 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 602, an application icon for a particular application can be placed at a relatively obscure position in an operating system user interface of a computing device. For example, an application icon for a game application can be placed on a seventh of seven sequentially ordered virtual screens that are contained within an operating system user interface of a computing device (e.g., a smart phone) that stores the game application.

In block 604, a rule that maps the particular application to a particular range of times of day and/or a particular range of days of the week can be stored on the computing device. For example, the computing device can store (e.g., in its persistent memory) a first rule that associates the game application with a time/day range of 7 p.m. through 11 p.m. on Monday through Friday, and a second rule that associates the game application with a time/day range of 7 a.m. through 11 p.m. on Saturday through Sunday. These are the days of the week, and the times on those days, during which the device's user is not likely to be at work, and therefore during which the device's user is more likely to be interested in playing the game application.

In block 606, the computing device's operating system can determine that the current time of day and/or the current day of the week fall within the particular range of times of day and/or the particular range of days of the week that the rule maps to the particular application. For example, the operating system can determine (e.g., using its internal clock) that the current time of day is 8 p.m. and the current day of the week is Friday. Placing alias icons for entertainment-oriented applications, such as the game application, in prominent positions while the current time of day and current day of the week reflect non-working times can be beneficial under such circumstances.

In block 608, in response to determining that the current time of day and/or the current day of the week are currently within the particular range of times of day and/or the particular range of days of the week that the rule maps to the particular application, the operating system can create an alias icon at a relatively prominent position in the operating system user interface while maintaining the original application icon at its relatively obscure position in the operating system user interface. For example, the operating system can create an alias icon for the game application on the first (i.e., main or home) virtual screen of the seven sequentially ordered virtual screens that are contained within the operating system user interface while maintaining the original game icon on the seventh virtual screen. For another example, the operating system can create an alias icon for the game application on a particular virtual screen that is currently being presented on the computing device's display, regardless of which of the seven sequentially ordered virtual screens is currently being presented, while maintaining the original game application icon on the seventh virtual screen. The operating system can create multiple such alias icons for multiple applications that are mapped, by separate rules, to the particular range of times of day and/or the particular range of days of the week. For example, rules can map various entertainment-based applications, such as game applications, music-playing applications, video-playing applications, note-taking applications, news-reading applications, and/or book-reading applications, to leisure time-of-day and day-of-the-week combinations.

In an embodiment of the invention, the operating system can temporarily shuffle one or more other application icons from the prominent virtual screen to other virtual screens to make room for the newly created alias icons. In one such embodiment of the invention, the operating system can choose to shuffle away a set of application icons that are associated with time-of-day and day-of-the-week combinations that are opposite the rule-specified time-of-day and day-of-the-week combinations. For example, while the current time-of-day and day-of-the-week combination falls within a range of leisure times-of-day and days-of-the-week, the operating system can temporarily move, to less prominent virtual screens, all application icons that are associated with work applications such as word processing applications, presentation applications, stock applications, etc. Such work applications are less likely to be used during leisure times-of-day and days-of-the-week.

User-Nonspecific Date-Based Conditions

Figure 7:
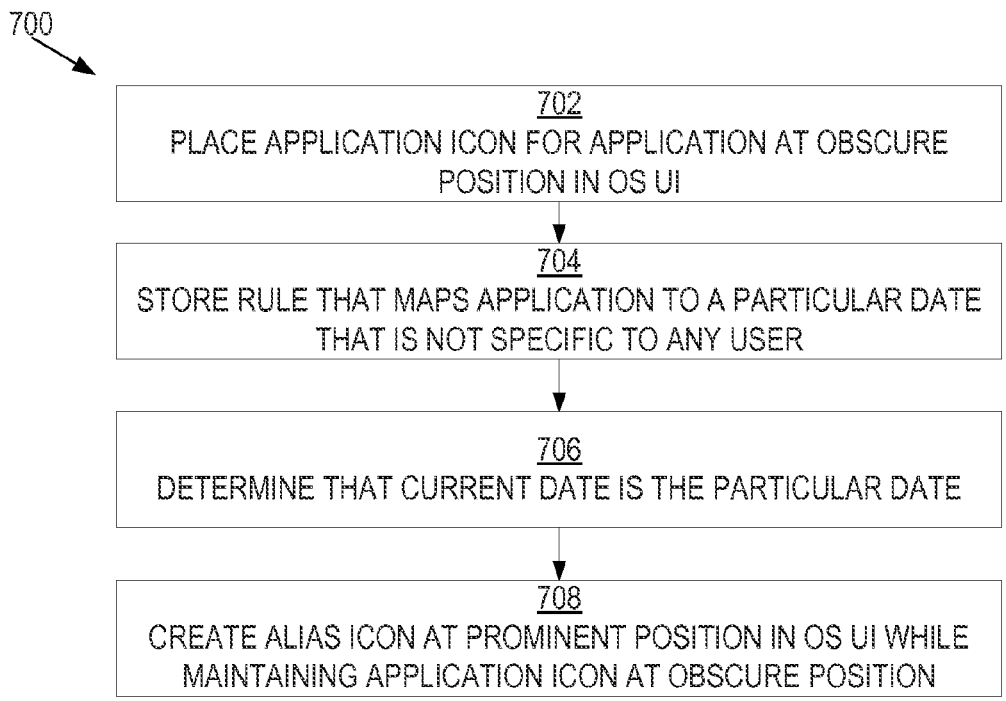
FIG. 7 is a flow diagram that illustrates an example technique for automatically creating an application alias at a prominent position in an operating system user interface in response to the current date being a specified date not specific to any particular user, according to an embodiment of the invention.

FIG. 7 is a flow diagram that illustrates an example technique 700 for automatically creating an application alias at a prominent position in an operating system user interface in response to the current date being a specified date not specific to any particular user, according to an embodiment of the invention. Although technique 700 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 702, an application icon for a particular application can be placed at a relatively obscure position in an operating system user interface of a computing device. For example, an application icon for a greeting card application can be placed on a seventh of seven sequentially ordered virtual screens that are contained within an operating system user interface of a computing device (e.g., a smart phone) that stores the greeting card application.

In block 704, a rule that maps the particular application to a particular date that is not specific to any particular user can be stored on the computing device. For example, the computing device can store (e.g., in its persistent memory) rules that associate the greeting card application with dates that are known holidays (e.g, Valentine's Day, Saint Patrick's Day, Easter, Memorial Day, Independence Day, Labor Day, Halloween, Thanksgiving Day, Christmas, etc.) for all users (or at least those within a geopolitical region). These are the dates on which a user (regardless of his specific identity) is likely to want to send greeting cards to loved ones, and therefore during which the device's user is more likely to be interested in accessing the greeting card application.

In block 706, the computing device's operating system can determine that the current date is a particular date that the rule maps to the particular application. For example, the operating system can determine (e.g., using its internal clock) that the current date is December 25 (Christmas). Placing alias icons for holiday-oriented applications, such as the greeting card application, in prominent positions while the current date reflects a holiday can be beneficial under such circumstances.

In block 708, in response to determining that the current date is a particular date that the rule maps to the particular application, the operating system can create an alias icon at a relatively prominent position in the operating system user interface while maintaining the original application icon at its relatively obscure position in the operating system user interface. For example, the operating system can create an alias icon for the greeting card application on the first (i.e., main or home) virtual screen of the seven sequentially ordered virtual screens that are contained within the operating system user interface while maintaining the original greeting card icon on the seventh virtual screen. For another example, the operating system can create an alias icon for the greeting card application on a particular virtual screen that is currently being presented on the computing device's display, regardless of which of the seven sequentially ordered virtual screens is currently being presented, while maintaining the original greeting card application icon on the seventh virtual screen.

User-Specific Contact-Based Conditions

Figure 8:
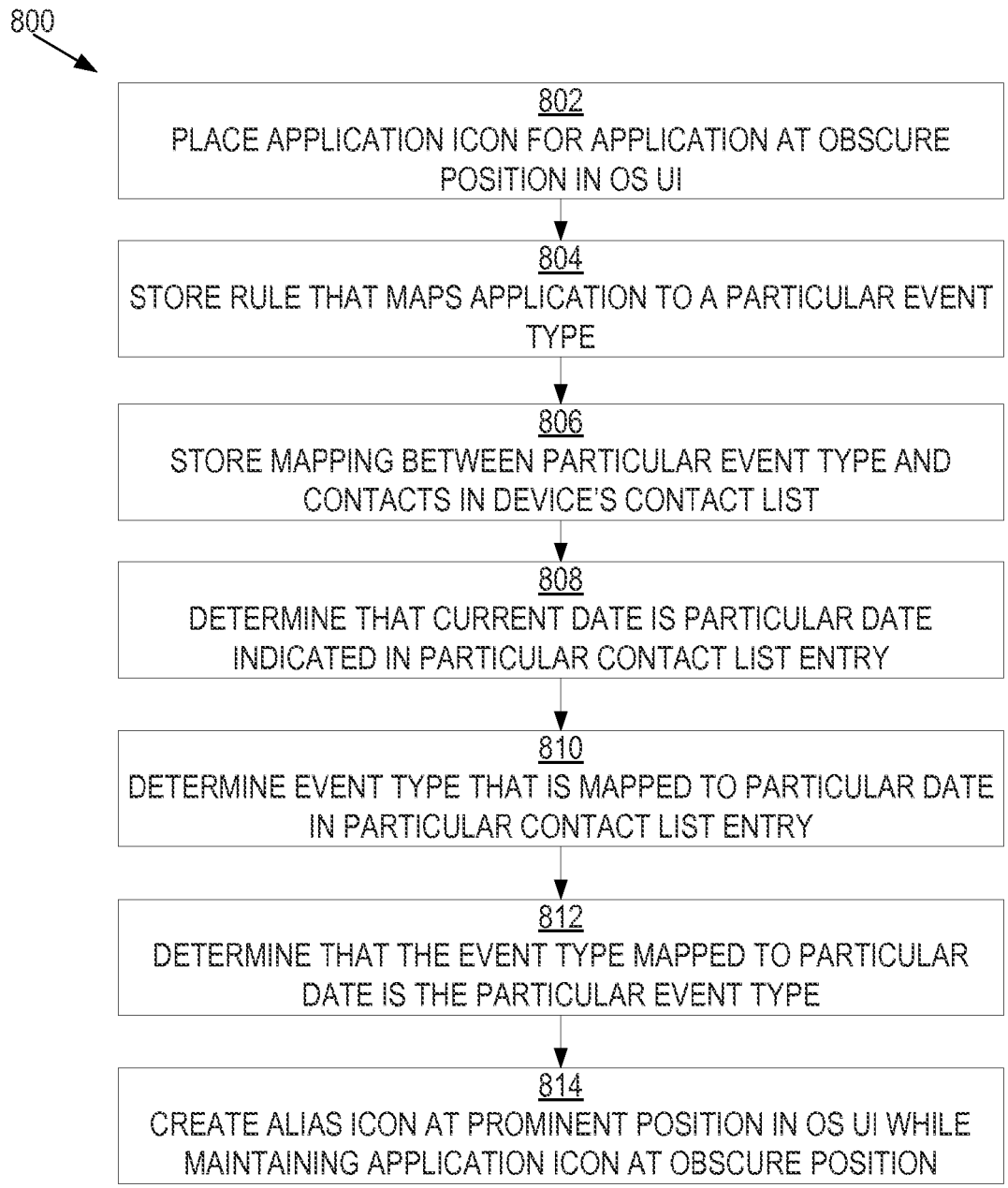
FIG. 8 is a flow diagram that illustrates an example technique for automatically creating an application alias at a prominent position in an operating system user interface in response to the current date being a date that is mapped to a contact in a computing device's stored contact list, according to an embodiment of the invention.

FIG. 8 is a flow diagram that illustrates an example technique 800 for automatically creating an application alias at a prominent position in an operating system user interface in response to the current date being a date that is mapped to a contact in a computing device's stored contact list, according to an embodiment of the invention. Although technique 800 is shown as involving the performance of particular operations in a particular order, alternative embodiments of the invention can involve more, fewer, and/or different operations than those depicted. Furthermore, in alternative embodiments of the invention, such operations can be performed in an order different from that illustrated.

In block 802, an application icon for a particular application can be placed at a relatively obscure position in an operating system user interface of a computing device. For example, an application icon for a florist application can be placed on a seventh of seven sequentially ordered virtual screens that are contained within an operating system user interface of a computing device (e.g., a smart phone) that stores the greeting card application.

In block 804, a rule that maps the particular application to a particular event type can be stored on the computing device. For example, the computing device can store (e.g., in its persistent memory) a rule that associates the florist application with a wedding anniversary event type. For example, the computing device can store (e.g., in its persistent memory) a rule that associates the florist application with a birthday event type. These are the events of the type for which a user is likely to want to send flowers to his spouse, and therefore during which the device's user is more likely to be interested in accessing the florist application.

In block 806, a mapping between the particular event type and one or more contacts in a contact list (i.e., of people) stored on the computing device can be stored on the computing device. For example, the computing device can store a mapping between the wedding anniversary event type and the user's spouse contact entry. For another example, the computing device can store a mapping between the birthday event type and contact entries for all of the user's friends. Each contact entry can indicate, for that contact, a set of dates that correspond to events of the event type for that person. For example, a particular contact entry may indicate that the contact's wedding anniversary is on a first date, and that the contact's birthday is on a second date.

In block 808, the computing device's operating system can determine that the current date is a particular date indicated in a particular contact's entry in the contact list. For example, the computing device can determine that the current date is indicated in a particular contact's entry.

In block 810, in response to determining that the current date is a particular date indicated in a particular contact's entry in the contact list, the computing device's operating system can determine an event type that is mapped to the particular date indicated in a particular contact's entry in the contact list. For example, the computing device can determine that the particular date is mapped to a wedding anniversary event type in a particular contact's entry. For another example, the computing device can determine that the particular date is mapped to a birthday event type in a particular contact's entry.

In block 812, the computing device's operating system can determine that the event type that is mapped to the particular date is a particular event type that the rule maps to the particular application. For example, the operating system can determine that the particular date is mapped to a wedding anniversary event type. For another example, the operating system can determine that the particular date is mapped to a birthday event type. Placing alias icons for contact-specific-event-oriented applications, such as the florist application, in prominent positions while the current date reflects a date that is relevant to a particular contact can be beneficial under such circumstances.

In block 814, in response to determining that the event type that is mapped to the particular date is a particular event type that the rule maps to the particular application, the operating system can create an alias icon at a relatively prominent position in the operating system user interface while maintaining the original application icon at its relatively obscure position in the operating system user interface. For example, the operating system can create an alias icon for the florist application on the first (i.e., main or home) virtual screen of the seven sequentially ordered virtual screens that are contained within the operating system user interface while maintaining the original florist icon on the seventh virtual screen. For another example, the operating system can create an alias icon for the florist application on a particular virtual screen that is currently being presented on the computing device's display, regardless of which of the seven sequentially ordered virtual screens is currently being presented, while maintaining the original florist application icon on the seventh virtual screen.

Although certain embodiments of the invention discussed above refer to the movement of, or insertion of aliases to, application icons in an operating system's user interface, alternative embodiments of the invention can involve user interface elements that are not application icons. For example, in an alternative embodiment of the invention, techniques discussed above in connection with application icons can be performed relative to graphical user interface widgets such as stock tickers, sports scoreboards, weather forecasters, etc. Such widgets can be moved temporarily from one location in a user interface to another location in the user interface in response to the occurrence of specified conditions or events. Such widgets can be moved back to their original locations in response to the specified conditions or events ceasing.

In an embodiment of the invention, a computing device can determine whether a specified event has occurred. In response to determining that the specified event has occurred, the computing device can automatically rearrange information on a display of the computing device. This automatic rearrangement of the information can involve the computing device presenting, unobscured on the display, particular information that previously was obscured from display but available for display on the computing device. In an embodiment of the invention, the rearrangement can involve at least temporarily moving an application icon that is located on a page other than a front page of a multi-page user interface to the front page of the multi-page user interface. In an embodiment of the invention, the rearrangement can involve at least temporarily presenting, on a front page of a multi-page user interface, an alias to an application icon that is located on a page other than the front page of a multi-page user interface. In an embodiment of the invention, the rearrangement can involve at least temporarily opening, in a multi-tabbed application, a particular tab that was obscured behind one or more other tabs of the multi-tabbed application prior to the rearranging. In an embodiment of the invention, the specified event can be specified by users other than users of the computing device. In an embodiment of the invention, the rearranged information can be an application icon. In an embodiment of the invention, the specified event can be mapped to an application to which the application icon corresponds by a producer of the application. In an embodiment of the invention, the specified event can be mapped to an application to which the application icon corresponds by a producer of an operating system of the computing device. In an embodiment of the invention, the specified event can be mapped to an application to which the application icon corresponds as a result of activities performed relative to the application by a plurality of users of a plurality of devices other than the computing device. In an embodiment of the invention, the determination of whether the specified event has occurred can involve a determination of whether a current date is a specified date that is mapped to the particular information within stored mapping data. In an embodiment of the invention, the determination of whether the specified event has occurred can involve determining whether a current location of the computing device is a specified location that is mapped to the particular information within stored mapping data. In an embodiment of the invention, the determination of whether the specified event has occurred can involve a determination of whether a current time of day is within a specified time interval that is mapped to the particular information within stored mapping data. In an embodiment of the invention, the determination of whether the specified event has occurred can involve a determination of whether a contact within a contact list stored on the computing device is mapped to an occasion having an occasion type that is mapped to the particular information within stored mapping data. In an embodiment of the invention, the determination of whether the specified event has occurred can involve a determination of whether a current date is mapped to an occasion having an occasion type that is mapped to the particular information within stored mapping data. In an embodiment of the invention, the determination of whether the specified event has occurred can involve a determination of whether the computing device has been set to a particular operational mode that is mapped to the particular information within stored mapping data.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
at a computing device with a current virtual screen and two or more secondary virtual screens, distinct from the current virtual screen, that each include a plurality of application icons associated with a plurality of applications, wherein each secondary virtual screen is one of a sequentially ordered set of virtual screens of an operating system user interface:
determining that a predefined rule stored on the computing device is satisfied, wherein the predefined rule is specific to a particular application associated with a respective application icon that is maintained at a fixed position in a respective secondary virtual screen of the two or more secondary virtual screens;
in response to determining that the predefined rule is satisfied:
automatically inserting onto the current virtual screen an alias icon comprising an alias of the respective application icon in the respective secondary virtual screen of the two or more secondary virtual screens, wherein the respective application icon and the alias icon are each configured such that user selection of either icon launches the particular application, and
continuing to maintain the respective application icon at the fixed position in the respective secondary virtual screen; and
after inserting the alias icon onto the current screen and in response to a determination that the predefined rule is no longer satisfied:
automatically removing the alias icon from the current virtual screen while continuing to display the current virtual screen; and
continuing to maintain the respective application icon at the fixed position in the respective secondary virtual screen.

2. The method of claim 1, wherein the predefined rule is a first predefined rule, the alias icon is a first alias icon, and the respective application icon is a first respective application icon, further comprising, at the computing device:
while the first alias icon is included in the current virtual screen, determining that a second predefined rule stored on the computing device is satisfied, wherein the second predefined rule is specific to a second particular application associated with a second respective application icon that is maintained at a fixed position in a respective one of the two or more secondary virtual screens;
in response to determining that the second predefined rule is satisfied:
automatically inserting onto the current virtual screen a second alias icon comprising an alias of the second respective application icon in the respective one of the two or more secondary virtual screens, wherein the second respective application icon and the second alias icon are each configured such that user selection of either icon launches the second particular application, and
continuing to maintain the second respective application icon at the fixed position in the respective secondary virtual screen; and
after inserting the second alias icon onto the current screen and in response to a determination that the second predefined rule is no longer satisfied:
automatically removing the second alias icon from the current virtual screen while continuing to display the current virtual screen; and
continuing to maintain the second respective application icon at the fixed position in the respective one of the two or more secondary virtual screens.

3. The method of claim 2, wherein determining that the first predefined rule stored on the computing device is satisfied comprises detecting a context based trigger condition and wherein determining that the second predefined rule stored on the computing device is satisfied comprises detecting a user input changing the computing device from a first device configuration to a second device configuration.

4. The method of claim 1, wherein the predefined rule is one of a location-based-condition that is satisfied in response to the computing device being at a specified location, a settings-based condition that is satisfied in response to settings of the computing device being in a specified configuration, and a time-based condition that is satisfied in response to a current date and time being a specified date and time.

5. The method of claim 1, wherein each of the virtual screens includes a respective plurality of application icons associated with a respective plurality of applications, and in response to determining that the predefined rule is no longer satisfied, the method further includes maintaining the respective plurality of application icons on each of the virtual screens.

6. The method of claim 1, further comprising:
in response to determining that the predefined rule is satisfied and in accordance with a determination that the current virtual screen lacks room for the alias icon, in addition to said inserting of the alias icon on the current virtual screen, shuffling one or more application icons from the current virtual screen to one or more of the two or more secondary virtual screens, in order to make room for the alias icon on the current virtual screen.

7. The method of claim 6, further comprising:
in response to determining that the predefined rule is no longer satisfied and after removing the alias icon from the current virtual screen while continuing to display the current virtual screen, reshuffling the one or more application icons back to the current virtual screen from the one or more of the two or more secondary virtual screens.

8. The method of claim 1, wherein, in response to determining that the predefined rule is satisfied, continuing to maintain the respective application icon, independent of any rule, in the respective secondary virtual screen of the two or more secondary virtual screens, and after inserting the alias icon onto the current screen and in response to a determination that the predefined rule is no longer satisfied, continuing to maintain the respective application icon, independent of any rule, in the respective secondary virtual screen of the two or more secondary virtual screens.

9. A computing device, comprising:
a current virtual screen and two or more secondary virtual screens, distinct from the current virtual screen, that each include a plurality of application icons associated with a plurality of applications, wherein each secondary virtual screen is one of a sequentially ordered set of virtual screens of an operating system user interface; and
memory storing an operating system configured to:
determine that a predefined rule stored on the computing device is satisfied, wherein the predefined rule is specific to a particular application associated with a respective application icon that is maintained at a fixed position in a respective secondary virtual screen of the two or more secondary virtual screens;

in response to determining that the predefined rule is satisfied:

automatically insert onto the current virtual screen an alias icon comprising an alias of the respective application icon in the respective secondary virtual screen of the two or more secondary virtual screens, wherein the respective application icon and the alias icon are each configured such that user selection of either icon launches the particular application, and continue to maintain the respective application icon at the fixed position in the respective secondary virtual screen; and after inserting the alias icon onto the current screen and in response to a determination that the predefined rule is no longer satisfied:

automatically remove the alias icon from the current virtual screen while continuing to display the current virtual screen; and continue to maintain the respective application icon at the fixed position in the respective secondary virtual screen.

10. The computing device of claim 9, wherein the predefined rule is a first predefined rule, the alias icon is a first alias icon, and the respective application icon is a first respective application icon, and wherein the memory storing the operating system is further configured to:

while the first alias icon is included in the current virtual screen, determine that a second predefined rule stored on the computing device is satisfied, wherein the second predefined rule is specific to a second particular application associated with a second respective application icon that is maintained at a fixed position in a respective one of the two or more secondary virtual screens;

in response to determining that the second predefined rule is satisfied:

automatically insert onto the current virtual screen a second alias icon comprising an alias of the second respective application icon in the respective one of the two or more secondary virtual screens, wherein the second respective application icon and the second alias icon are each configured such that user selection of either icon launches the second particular application, and continue to maintain the second respective application icon at the fixed position in the respective secondary virtual screen; and after inserting the second alias icon onto the current screen and in response to a determination that the second predefined rule is no longer satisfied:

automatically remove the second alias icon from the current virtual screen while continuing to display the current virtual screen; and continue to maintain the second respective application icon at the fixed position in the respective one of the two or more secondary virtual screens.

11. The computing device of claim 10, wherein determining that the first predefined rule stored on the computing device is satisfied comprises detecting a context based trigger condition and wherein determining that the second predefined rule stored on the computing device is satisfied comprises detecting a user input changing the computing device from a first device configuration to a second device configuration.

12. The computing device of claim 9, wherein the predefined rule is one of a location-based-condition that is satisfied in response to the computing device being at a specified location, a settings-based condition that is satisfied in response to settings of the computing device being in a specified configuration, and a time-based condition that is satisfied in response to a current date and time being a specified date and time.

13. The computing device of claim 9, wherein each of the virtual screens includes a respective plurality of application icons associated with a respective plurality of applications, and in response to determining that the predefined rule is no longer satisfied, the memory storing the operating system is further configured to maintain the respective plurality of application icons on each of the virtual screens.

14. The computing device of claim 9, wherein, in response to determining that the predefined rule is satisfied and in accordance with a determination that the current virtual screen lacks room for the alias icon, in addition to said inserting of the alias icon on the current virtual screen, the memory storing the operating system is further configured to shuffle one or more application icons from the current virtual screen to one or more of the two or more secondary virtual screens in order to make room for the alias icon on the current virtual screen.

15. The computing device of claim 9, wherein, in response to determining that the predefined rule is satisfied, continuing to maintain the respective application icon, independent of any rule, in the respective secondary virtual screen of the two or more secondary virtual screens, and after inserting the alias icon onto the current screen and in response to a determination that the predefined rule is no longer satisfied, continuing to maintain the respective application icon, independent of any rule, in the respective secondary virtual screen of the two or more secondary virtual screens.

16. A non-transitory computer-readable memory storing particular instructions to cause one or more processors to perform operations, the particular instructions comprising instructions to cause the processors to:

determine, at a computing device with a current virtual screen and two or more secondary virtual screens, distinct from the current virtual screen, that each include a plurality of application icons associated with a plurality of applications, wherein each secondary virtual screen is one of a sequentially ordered set of virtual screens of an operating system user interface, that a predefined rule stored on the computing device is satisfied, wherein the predefined rule is specific to a particular application associated with a respective application icon that is maintained at a fixed position in a respective secondary virtual screen of the two or more secondary virtual screens;

in response to determining that the predefined rule is satisfied:

automatically insert onto the current virtual screen an alias icon comprising an alias of the respective application icon in the respective secondary virtual screen of the two or more secondary virtual screens, wherein the respective application icon and the alias icon are each configured such that user selection of either icon launches the particular application, and continue to maintain the respective application icon at the fixed position in the respective secondary virtual screen; and after inserting the alias icon onto the current screen and in response to a determination that the predefined rule is no longer satisfied:

automatically remove the alias icon from the current virtual screen while continuing to display the current virtual screen; and continue to maintain the respective application icon at the fixed position in the respective secondary virtual screen.

17. The computer-readable memory of claim 16, wherein the predefined rule is a first predefined rule, the alias icon is a first alias icon, and the respective application icon is a first respective application icon, and the non-transitory computer-readable memory further comprising instructions to cause the processors to:

while the first alias icon is included in the current virtual screen, determine that a second predefined rule stored on the computing device is satisfied, wherein the second predefined rule is specific to a second particular application associated with a second respective application icon that is maintained at a fixed position in a respective one of the two or more secondary virtual screens;

in response to determining that the second predefined rule is satisfied:

automatically insert onto the current virtual screen a second alias icon comprising an alias of the second respective application icon in the respective one of the two or more secondary virtual screens, wherein the second respective application icon and the second alias icon are each configured such that user selection of either icon launches the second particular application, and continue to maintain the second respective application icon at the fixed position in the respective secondary virtual screen; and after inserting the second alias icon onto the current screen and in response to a determination that the second predefined rule is no longer satisfied:

automatically remove the second alias icon from the current virtual screen while continuing to display the current virtual screen; and continue to maintain the second respective application icon at the fixed position in the respective one of the two or more secondary virtual screens.

18. The computer-readable memory of claim 17, wherein determining that the first predefined rule stored on the computing device is satisfied comprises detecting a context based trigger condition and wherein determining that the second predefined rule stored on the computing device is satisfied comprises detecting a user input changing the computing device from a first device configuration to a second device configuration.

19. The computer-readable memory of claim 16, wherein the predefined rule is one of a location-based-condition that is satisfied in response to the computing device being at a specified location, a settings-based condition that is satisfied in response to settings of the computing device being in a specified configuration, and a time-based condition that is satisfied in response to a current date and time being a specified date and time.

20. The computer-readable memory of claim 16, wherein each of the virtual screens includes a respective plurality of application icons associated with a respective plurality of applications, and in response to determining that the predefined rule is no longer satisfied, the computer-readable memory further comprising instructions to cause the processors to maintain the respective plurality of application icons on each of the virtual screens.

21. The computer-readable memory of claim 16, wherein, in response to determining that the predefined rule is satisfied and in accordance with a determination that the current virtual screen lacks room for the alias icon, in addition to said inserting of the alias icon on the current virtual screen, the non-transitory computer-readable memory further comprises instructions to cause the processors to shuffle one or more application icons from the current virtual screen to one or more of the two or more secondary virtual screens in order to make room for the alias icon on the current virtual screen.

22. The computer-readable memory of claim 16, wherein, in response to determining that the predefined rule is satisfied, continuing to maintain the respective application icon, independent of any rule, in the respective secondary virtual screen of the two or more secondary virtual screens, and after inserting the alias icon onto the current screen and in response to a determination that the predefined rule is no longer satisfied, continuing to maintain the respective application icon, independent of any rule, in the respective secondary virtual screen of the two or more secondary virtual screens.

* * * * *